US009955195B2

(12) United States Patent
Soroushian

(10) Patent No.: US 9,955,195 B2
(45) Date of Patent: Apr. 24, 2018

(54) SYSTEMS AND METHODS FOR ENCODING AND STREAMING VIDEO ENCODED USING A PLURALITY OF MAXIMUM BITRATE LEVELS

(75) Inventor: Kourosh Soroushian, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 391 days.

(21) Appl. No.: 13/600,046

(22) Filed: Aug. 30, 2012

(65) Prior Publication Data

US 2013/0058393 A1   Mar. 7, 2013

Related U.S. Application Data

(60) Provisional application No. 61/529,201, filed on Aug. 30, 2011.

(51) Int. Cl.
*H04N 7/26* (2006.01)
*H04N 21/2343* (2011.01)
(Continued)

(52) U.S. Cl.
CPC ... *H04N 21/234372* (2013.01); *H04N 19/115* (2014.11); *H04N 19/146* (2014.11);
(Continued)

(58) Field of Classification Search
CPC .... H04N 19/70; H04N 19/115; H04L 65/607; H04L 65/80
See application file for complete search history.

(56) References Cited

U.S. PATENT DOCUMENTS 3,919,474 A  11/1975 Benson
4,974,260 A  11/1990 Rudak
(Continued)

FOREIGN PATENT DOCUMENTS

CN  1662952 A  8/2005
CN  102138327 A  7/2011
(Continued)

OTHER PUBLICATIONS

International Search Report and Written Opinion for International Application No. PCT/US2012/053052, International Filing Date Aug. 30, 2012, Report Completed Oct. 25, 2012, dated Nov. 16, 2012, 9 pgs.
International Search Report and Written Opinion for International Application No. PCT/US2012/053053, International Filing Date Aug. 30, 2012, Completed Oct. 23, 2012, 11 pgs.
Extended European Search Report for European Application No. EP12828956.8, Report Completed Feb. 18, 2015, dated Mar. 2, 2015, 13 Pgs.
(Continued)

*Primary Examiner* — Zhubing Ren
(74) *Attorney, Agent, or Firm* — KPPB LLP

(57) ABSTRACT

Systems and methods for streaming and playing back video having a variety of resolutions, frame rates, and/or sample aspect ratios, where the video streams are encoded at one of a number of maximum bit rate levels, in accordance with embodiments of the invention are disclosed. One embodiment includes a processor, and storage containing data relating combinations of resolution and frame rates to maximum bitrates, where a plurality of resolution and frame rates that are related to the same maximum bitrate form a maximum bitrate level. In addition, an encoding application configures the processor to encode a video stream as a plurality of video streams having different resolutions and frame rates, where the target maximum bitrate used during the encoding is selected based upon the maximum bitrate levels of the resolution and frame rate combinations indicated within the data relating combinations of resolution and frame rates to maximum bitrates.

5 Claims, 6 Drawing Sheets

(51) Int. Cl.
  *H04N 21/2662* (2011.01)
  *H04N 19/115* (2014.01)
  *H04N 19/146* (2014.01)
  *H04N 19/157* (2014.01)

(52) U.S. Cl.
  CPC ..... *H04N 19/157* (2014.11); *H04N 21/23439* (2013.01); *H04N 21/234381* (2013.01); *H04N 21/2662* (2013.01)

(56) References Cited

U.S. PATENT DOCUMENTS

| | | | |
|---|---|---|---|
| 5,912,710 | A | 6/1999 | Fujimoto |
| 6,005,621 | A | 12/1999 | Linzer et al. |
| 6,157,410 | A | 12/2000 | Izumi et al. |
| 6,430,354 | B1 | 8/2002 | Watanabe |
| 6,920,179 | B1 | 7/2005 | Anand et al. |
| 8,818,171 | B2 | 8/2014 | Soroushian et al. |
| 9,467,708 | B2 | 10/2016 | Soroushian et al. |
| 9,510,031 | B2 | 11/2016 | Soroushian et al. |
| 2003/0142872 | A1 | 7/2003 | Koyanagi |
| 2004/0150747 | A1 | 8/2004 | Sita |
| 2004/0208245 | A1 | 10/2004 | Macinnis et al. |
| 2005/0089091 | A1 | 4/2005 | Zhao et al. |
| 2005/0157948 | A1 | 7/2005 | Lee |
| 2005/0210145 | A1 | 9/2005 | Kim et al. |
| 2006/0039481 | A1 | 2/2006 | Shen |
| 2006/0126717 | A1 | 6/2006 | Boyce et al. |
| 2007/0024706 | A1 | 2/2007 | Brannon, Jr. et al. |
| 2007/0053293 | A1 | 3/2007 | Mcdonald et al. |
| 2008/0030614 | A1 | 2/2008 | Schwab |
| 2008/0052306 | A1 | 2/2008 | Wang et al. |
| 2008/0137848 | A1 | 6/2008 | Kocher et al. |
| 2008/0196076 | A1 | 8/2008 | Shatz et al. |
| 2008/0266522 | A1 | 10/2008 | Weisgerber |
| 2009/0116821 | A1 | 5/2009 | Shibamiya et al. |
| 2009/0300204 | A1 | 12/2009 | Zhang et al. |
| 2010/0002069 | A1 | 1/2010 | Eleftheriadis et al. |
| 2011/0022432 | A1 | 1/2011 | Ishida et al. |
| 2011/0082924 | A1 | 4/2011 | Gopalakrishnan |
| 2011/0099594 | A1 | 4/2011 | Chen et al. |
| 2011/0126104 | A1 | 5/2011 | Woods et al. |
| 2011/0164679 | A1* | 7/2011 | Satou et al. ............ 375/240.03 |
| 2011/0170408 | A1 | 7/2011 | Furbeck et al. |
| 2011/0280307 | A1 | 11/2011 | MacInnis |
| 2012/0173751 | A1 | 7/2012 | Braness et al. |
| 2012/0177101 | A1 | 7/2012 | Van Der Schaar |
| 2013/0051767 | A1 | 2/2013 | Soroushian et al. |
| 2013/0051768 | A1 | 2/2013 | Soroushian et al. |
| 2013/0169863 | A1 | 7/2013 | Smith |
| 2014/0355958 | A1 | 12/2014 | Soroushian et al. |
| 2017/0026445 | A1 | 1/2017 | Soroushian et al. |
| 2017/0041604 | A1 | 2/2017 | Soroushian et al. |

FOREIGN PATENT DOCUMENTS

| | | |
|---|---|---|
| CN | 103858419 A | 6/2014 |
| CN | 103875248 A | 6/2014 |
| EP | 1335603 A2 | 8/2003 |
| JP | 2009508452 A | 2/2009 |
| WO | 2011053658 A1 | 5/2011 |
| WO | 2011059291 A2 | 5/2011 |
| WO | 2011087449 A1 | 7/2011 |
| WO | 2011093835 A1 | 8/2011 |
| WO | 2011102791 A1 | 8/2011 |
| WO | 2013033334 A1 | 3/2013 |
| WO | 2013033335 A1 | 3/2013 |
| WO | 2013033458 A2 | 3/2013 |
| WO | 2013033458 A3 | 5/2013 |

OTHER PUBLICATIONS

Lippens, Fecheyr A., "A Review of HTTP Live Streaming", Internet Citation, Jan. 25, 2010, X P002638990, Retrieved from http://issuu.com/andruby/docs/http_live_streaming on May 24, 2011, 38 Pages.

Watson, Mark, "Input for DASH EE#1 (CMP): Pixel Aspect Ratio", 94. MPEG Meeting, Oct. 11, 2010-Oct. 15, 2010, Guangzhou, (Motion Picture Expert Group or ISO/IEC JTC1/SC29/WG11), No. M18498, Oct. 28, 2010, XP030047088, 4 Pages.

International Search Report and Written Opinion for International Application PCT/US2012/05223, completed Dec. 7, 2012, dated Mar. 7, 2013, 10 pgs.

International Search Report for International Application No PCT/SE2011/050166, Search completed Mar. 3, 2011, dated Mar. 3, 2011, 5 Pgs.

"Adaptive HTTP Streaming in PSS-Client Behaviour", S4-AHI129, 3GPP TSG-SA4 Ad-Hoc Meeting, Dec. 14-16, 2009, Paris, France; section 12.6.1.

"Adaptive HTTP Streaming in PSS-Data Formats for HTTP-Streaming excluding MPD", S4-AHI128, 3GPP TSGSA4 Ad-Hoc Meeting, Dec. 14-16, 2009, Paris, France; sections 12.2.1 and 12.2.4.2.1.

"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19.

"Fragmented Time Indexing of Representations", S4-AHI126, 3GPP TSG-SA4 Ad-Hoc Meeting, Dec. 14-16, 2009, Paris, France.

"Transparent end-to-end packet switched streaming service (PSS); 3GPP file format (3GP) (Release 9)", 3GPP TS 26.244 V9.0.0 (Dec. 2009),sections 7.1-7.4.

International Preliminary Report on Patentability for International Application No. PCT/US2012/053223, Report Issued Mar. 4, 2014, dated Mar. 13, 2014, 7 pgs.

International Search Report and Written Opinion for International Application No. PCT/US2012/053223, International Filing Date Aug. 30, 2012, Report Completed Dec. 7, 2012, dated Mar. 7, 2013, 10 pgs.

* cited by examiner

| Actual Resolution | DivX Plus Bitrate | Final Resolution | Frames Per Second | Level | Average Bitrate for Level | Maximum Profile Bitrate |
|---|---|---|---|---|---|---|
| 1920x1080 | 8969 | 1920x1080 | 30 | 9 | 8435 | 8400 |
| 1920x1080 | 8482 | 1920x1080 | 25 | | | |
| 1920x1040 | 7854 | 1920x1040 | 24 | | | |
| 1440x1080 | 5747 | 1920x1080 | 30 | 8 | 5378 | 5300 |
| 1440x1080 | 5438 | 1920x1080 | 25 | | | |
| 1920x816 | 5406 | 1920x816 | 24 | | | |
| 1920x800 | 5248 | 1920x800 | 24 | | | |
| 1440x1040 | 5053 | 1920x1040 | 24 | | | |
| 1440x816 | 3557 | 1920x816 | 24 | 7 | 3508 | 3500 |
| 1440x800 | 3459 | 1920x800 | 24 | | | |
| 1280x720 | 2736 | 1920x1080 | 30 | 6 | 2666 | 2400 |
| 1280x720 | 2596 | 1920x1080 | 25 | | | |
| 960x720 | 1895 | 1920x1080 | 30 | 5 | 1742 | 1750 |
| 1152x624 | 1860 | 1920x1040 | 24 | | | |
| 960x720 | 1802 | 1920x1080 | 25 | | | |
| 1280x544 | 1789 | 1920x816 | 24 | | | |
| 1152x480 | 1366 | 1920x800 | 24 | | | |
| 960x544 | 1281 | 1920x816 | 24 | 4 | 1144 | 1200 |
| 960x520 | 1220 | 1920x1040 | 24 | | | |
| 960x400 | 931 | 1920x800 | 24 | | | |
| 768x432 | 857 | 1920x1080 | 30 | 3 | 796 | 800 |
| 768x432 | 822 | 1920x1080 | 25 | | | |
| 768x416 | 783 | 1920x1040 | 24 | | | |
| 720x408 | 720 | 1920x816 | 24 | | | |
| 768x320 | 600 | 1920x800 | 24 | 2 | 600 | 600 |
| 576x312 | 456 | 1920x1040 | 24 | 1 | 418 | 400 |
| 640x272 | 445 | 1920x816 | 24 | | | |
| 512x288 | 407 | 1920x1080 | 30 | | | |
| 512x288 | 400 | 1920x1080 | 25 | | | |
| 576x240 | 382 | 1920x800 | 24 | | | |

| Streaming Bitrate | Aspect Ratio, Frames Per Second | | | | |
|---|---|---|---|---|---|
| | 16:9, 29.97 or 30 | 16:9, 25 | 1.85:1, 23.976 or 24 | 2.35:1, 23.976 or 24 | 2.4:1, 23.976 or 24 |
| 400 | 768x432 | 768x432 | 768x416 | 768x328 | 768x320 |
| 600 | 768x432 | 768x432 | 768x416 | 768x328 | 768x320 |
| 800 | 768x432 | 768x432 | 768x416 | 768x328 | 768x320 |
| 1200 | 768x432 | 768x432 | 768x416 | 768x328 | 768x320 |
| 1750 | 1280x720 | 1280x720 | 1152x624 | 1280x544 | 1152x480 |
| 2400 | 1280x720 | 1280x720 | 1152x624 | 1280x544 | 1152x480 |
| 3500 | 1920x1080 | 1920x1080 | 1920x1040 | 1920x816 | 1920x800 |
| 5300 | 1920x1080 | 1920x1080 | 1920x1040 | 1920x816 | 1920x800 |
| 8400 | 1920x1080 | 1920x1080 | 1920x1040 | 1920x816 | 1920x800 |

SYSTEMS AND METHODS FOR ENCODING AND STREAMING VIDEO ENCODED USING A PLURALITY OF MAXIMUM BITRATE LEVELS

CROSS-REFERENCE TO RELATED APPLICATIONS

The current application claims priority to U.S. Provisional Patent Application No. 61/529,201, filed Aug. 30, 2011, the disclosure of which is incorporated herein by reference.

FIELD OF THE INVENTION

The present invention relates to the delivery of multimedia content, specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods in accordance with embodiments of the invention stream and play back video having a variety of resolutions, frame rates, and/or sample aspect ratios, where the video streams are encoded at one of a limited number of maximum bit rate levels. One embodiment includes a processor, and storage containing an encoding application and data relating combinations of resolution and frame rates to maximum bitrates, where a plurality of resolution and frame rates that are related to the same maximum bitrate form a maximum bitrate level. In addition, the encoding application configures the processor to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates.

In a further embodiment, the resolution and frame rates within a maximum bitrate level have optimal target maximum bitrates that are within a predetermined percentage of the highest optimal target maximum bitrate of a resolution and frame rate combination within the maximum bitrate level.

In another embodiment, the optimal target maximum bitrate of a resolution and frame rate combination is determined using a formula.

In a still further embodiment, the optimal target maximum bitrate of a resolution and frame rate combination is determined using experimentation.

In still another embodiment, the resolution and frame rates within a maximum bitrate level have optimal target maximum bitrates that are within a predetermined percentage of the optimal target maximum bitrate of at least one other resolution and frame rate combination within the maximum bitrate level.

In a yet further embodiment, the data relating combinations of resolution and frame rates to maximum bitrate levels relates the resolution and frame rates to maximum bitrates in the manner illustrated in FIG. 5.

Yet another embodiment includes a plurality of playback devices, where the playback devices have different display aspect ratios and utilize different types of network connections, and a streaming system comprising a plurality of servers on which a plurality of video streams are stored, where the plurality of video streams are encoded at different resolutions and frame rates. In addition, video streams stored on the streaming system are encoded using one of a plurality of maximum bitrate levels, where video streams having different resolutions and frame rates are encoded at the same maximum bitrate level, the playback devices are configured to support playback of video data encoded at maximum bitrates corresponding to a plurality of the maximum bitrate levels, the playback devices are configured to request video data from at least one video stream from the streaming system encoded at a maximum bitrate level supported by the playback device, and the playback devices are configured to playback video data encoded at a supported maximum bitrate level received from the streaming system.

A further embodiment again also includes a source encoder including storage containing data relating combinations of resolution and frame rates to maximum bitrate levels. In addition, the source encoder is configured to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates levels.

In another embodiment again, the data relating combinations of resolution and frame rates to maximum bitrate levels relates the resolution and frame rates to maximum bitrate levels in the manner illustrated in FIG. 5.

A further additional embodiment includes a machine readable medium containing processor instructions, where execution of the instructions by a processor causes the processor to perform a process for determining a set of maximum bitrate levels for encoding video data for use in a streaming system including playback devices having different display aspect ratios and network connections. In addition, the process includes selecting a set of resolution and frame rate combinations, determining the optimal target maximum bitrate for encoding a stream of video data at each resolution and frame rate combination, grouping the resolution and frame rate combinations into maximum bitrate levels based upon the optimal target maximum bitrates of the resolution and frame rate combinations utilizing at least one grouping criterion, and determining a target maximum bitrate for the resolution and frame rate combinations in a maximum bitrate level.

In another additional embodiment, the optimal target maximum bitrate of a resolution and frame rate combination is determined using a formula.

In a still yet further embodiment, the optimal target maximum bitrate of a resolution and frame combination is determined using experimentation.

In still yet another embodiment, the at least one grouping criterion groups resolution and frame rates within a maximum bitrate level that have optimal target maximum bitrates that are within a predetermined percentage of the highest optimal target maximum bitrate of a resolution and frame rate combination within the maximum bitrate level.

In a still further embodiment again, the at least one grouping criterion groups resolution and frame rates within a maximum bitrate level that have optimal target maximum bitrates that are within a predetermined percentage of the optimal target maximum bitrate of at least one other resolution and frame rate combination within the maximum bitrate level.

In still another embodiment again, determining a target maximum bitrate for the resolution and frame rate combinations in a maximum bitrate level includes selecting the maximum optimal target bitrate of a resolution and frame rate combination within the maximum bitrate level.

In a still further additional embodiment, determining a target maximum bitrate for the resolution and frame rate combinations in a maximum bitrate level includes selecting the minimum optimal target bitrate of a resolution and frame rate combination within the maximum bitrate level.

In still another additional embodiment, determining a target maximum bitrate for the resolution and frame rate combinations in a maximum bitrate level includes selecting the average optimal target bitrate of the resolution and frame rate combinations within the maximum bitrate level.

A yet further embodiment again also includes rounding the average optimal target bitrate using a predetermined rounding function.

In yet another embodiment again, determining a target maximum bitrate for the resolution and frame rate combinations in a maximum bitrate level includes selecting one of a plurality known network data rates based upon the optimal target data rate of at least one of the resolution and frame rate combinations within the maximum bitrate level.

BRIEF DESCRIPTION OF THE DRAWINGS

FIG. 5 is a table illustrating an example of a set of resolutions with encoded bitrates matched to maximum profile bitrates in accordance with an embodiment of the invention.

FIG. 6 is a table illustrating an example of sets of resolutions for different aspect ratios, where the resolutions in each set are encoded so that each aspect ratio is encoded at a resolution falling within each of the maximum bitrate levels in accordance with an embodiment of the invention.

DETAILED DISCLOSURE OF THE INVENTION

Figure 1:
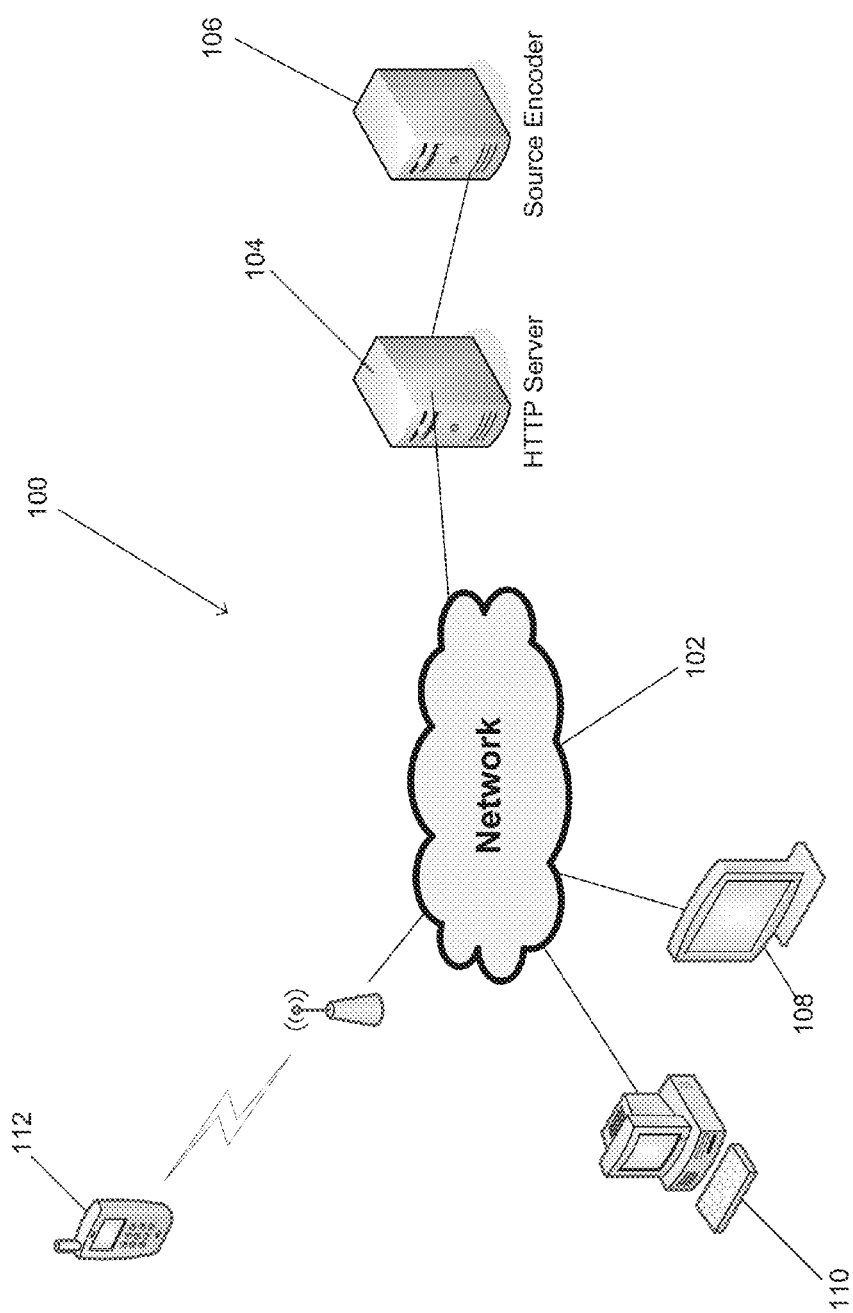
FIG. 1 is a network diagram of a level bitrate adaptive streaming system in accordance with an embodiment of the invention.

Turning now to the drawings, systems and methods for streaming and playing back video having a variety of resolutions, frame rates, and/or sample aspect ratios, where the video streams are encoded at one of a limited number of maximum bit rate levels, in accordance with embodiments of the invention are illustrated. Video data is typically encoded to achieve a target maximum bitrate. The quality of video encoded with a specific resolution, and frame rate typically does not improve appreciably beyond a specific maximum bitrate threshold. Beyond that threshold, increasing the resolution of the encoded video can increase video quality. A formula can be used to recommend an optimal target maximum bitrate at which to encode video content at a specific resolution and frame rate efficiently and with the highest video quality achievable at the selected resolution. Alternatively, the bitrate threshold at which video quality does not appreciably improve can be determined through testing. While it can be beneficial to determine the optimal maximum bitrate at which to encode a specific piece of video content to efficiently achieve the highest quality video at a specific resolution and frame rate, the delivery of a large number of streams of video content to a large variety of playback devices can be simplified by specifying a limited number of maximum bitrates at which video can be encoded irrespective of the optimal target maximum bitrate for a specific frame rate and resolution combination. The ability of a specific type of playback device to playback video encoded at a specific maximum bitrate is typically confirmed via testing. Therefore, the smaller the number of maximum bitrate levels supported by a streaming system, the simpler the process of testing each playback device to confirm its ability to playback video encoded at supported target maximum bitrates. Accordingly, streaming systems can utilize a set of maximum bitrate levels to simply the process of certifying playback devices for use within the streaming system. When video is encoded for distribution via the streaming system at a number of different resolutions and frame rates, the maximum bitrate levels appropriate to each of the specific resolution and frame combinations can be selected and used as the target maximum bitrates when encoding the streams of video data.

In several embodiments, the process of selecting a set of maximum bitrate levels to use when encoding video for distribution via a streaming system involves determining the most popular aspect ratios and frame rates for video content and then determining all of the streaming resolutions and frame rates at which the video content will be encoded. When the most likely resolution and frame rate combinations are identified, the optimal target maximum bitrates for each resolution and frame rate combination can be determined using an appropriate bitrate formula or testing. Bitrate formulas that can be utilized to determine a optimal target maximum bitrate at which to encode video at a specified resolution and frame rate are discussed in U.S. patent application Ser. No. 13/432,521 entitled "Systems and Methods for Encoding Alternative Streams of Video for Playback on Playback Devices having Predetermined Display Aspect Ratios and Network Connection Maximum Data Rates", to Soroushian et al., filed Mar. 28, 2012 (the disclosure of which is incorporated by reference herein in its entirety). The optimal target maximum bitrates can then be grouped into levels and a maximum bitrate determined for each level.

In several embodiments, the resolution and frame rate combinations can be grouped into levels based upon their corresponding optimal target maximum bitrates so that all optimal target maximum bitrates within a group are within a predetermined percentage of the highest optimal target maximum bitrate within the group. In many embodiments, the resolution and frame rate combinations can be grouped into levels based upon their corresponding optimal target maximum bitrates so that each optimal target maximum bitrate within the group is within a predetermined percentage of the next highest optimal target maximum bitrate within the group. In other embodiments, any of a variety of grouping criteria can be utilized in accordance with embodiments of the invention including criteria that group resolution and frame rate combinations into a predetermined number of groups based upon their optimal target maximum bitrates.

The maximum bitrate that is assigned to the resolution and frame rate combinations at a level can be determined in any number of different ways including (but not limited to) the average bitrate of the optimal target maximum bitrates included in the group, the minimum bitrate of the optimal target maximum bitrates included in the level, and/or a typical network connection data rate that is close to one or more of the target maximum bitrates in the level. The maximum bitrate determined for each level can then be used to encode content at the resolution and frame rate combinations within the level. In several embodiments, the process of determining the maximum bitrate levels is performed in a first process and the maximum bit rate levels and the resolution and frame rate combinations that fall within each level can be provided to a source encoding system for use in the encoding of video content.

In many embodiments, the streaming system is an adaptive bitrate streaming system. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety. In adaptive bitrate streaming systems, a number of alternative streams are likely to be encoded having the same aspect ratio, but different resolutions. Systems and methods for selecting the resolutions at which to encode alternative streams of video for use in adaptive bitrate streaming systems are described in U.S. patent application Ser. No. 13/430,032 entitled "Selection of Resolutions for Seamless Resolution Switching of Multimedia Content" to Soroushian et al., filed Mar. 26, 2012 (the disclosure of which is incorporated by reference herein in its entirety). Although much of the discussion that follows references adaptive bitrate streaming systems, systems and methods in accordance with embodiments of the invention can be utilized in streaming systems that are non-adaptive. Systems and methods for streaming video at a plurality of resolution and frame rates using a smaller set of maximum bit rate levels in accordance with embodiments of the invention are discussed further below.

System Overview

A streaming system in accordance with an embodiment of the invention is illustrated in FIG. 1. The streaming system 100 includes a source encoder 106 configured to encode source video as a number of alternative video streams. Alternative streams are streams that encode the same media content in different ways. In many instances, alternative streams encode media content (such as but not limited to video) at different resolution and sample aspect ratio combinations and different maximum bitrates. In a number of embodiments, alternative video streams form sets of alternative video streams encoded with the same aspect ratio corresponding to the display aspect ratio of a set of playback devices. In many embodiments, the source encoder possesses a lookup table that indexes resolution and frame rate combinations to a predetermined set of maximum bitrate levels. The source encoder uses the lookup table to determine the target maximum bitrate at which to encode video at a specific resolution and frame rate combination.

In many embodiments, the streaming system is an adaptive bitrate streaming system and the source encoder encodes each alternative stream into a separate container file and generates a top level index file describing each of the streams contained within the container files. The top level index file and the container files are uploaded to an HTTP server 104. In other embodiments, the container files are uploaded to an HTTP server 104 and the top level index file is dynamically generated in response to a request for a specific piece of content by a playback device. In the illustrated embodiment, the source encoder is a server. In other embodiments, the source encoder can be any processing device including a processor and sufficient resources to perform the transcoding of source media (including but not limited to video, audio, and/or subtitles).

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams at a lower resolution utilizing less bandwidth and resulting in the playback device transitioning to a phase in which the playback device assumes unstable operating conditions, buffers less content, and responds rapidly to variations in streaming conditions.

Source Encoders

Figure 2:
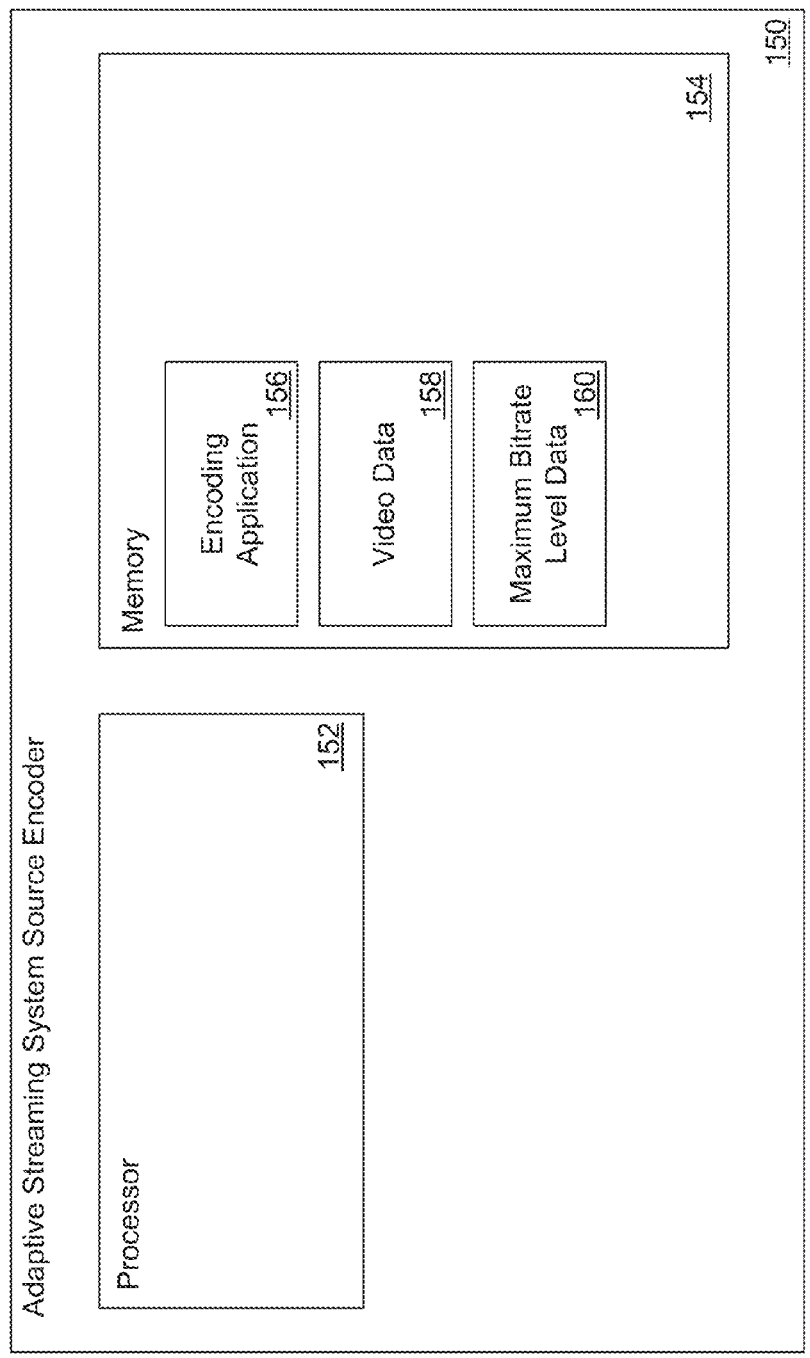
FIG. 2 conceptually illustrates a playback device configured to deliver video data encoded utilizing target maximum bitrate levels in accordance with an embodiment of the invention.

Source encoders in accordance with embodiments of the invention are utilized to encode source content at any of a number of resolutions and frame rates at target maximum bitrates determined using a set of predetermined maximum bitrate levels. The basic architecture of a source encoder in accordance with an embodiment of the invention is illustrated in FIG. 2. The source encoder 150 includes a processor 152 in communication with memory 154. In the illustrated embodiment, the memory 154 includes an encoding application 156, video data 158, which can include (but is not limited to) source video data and encoded alternative streams of video data, and data describing the target maximum bitrates at which to encode a plurality of resolution and frame rate combinations 160. In many embodiments, the target maximum bitrates are selected from a set of predetermined maximum bitrate levels that includes a number of levels that is smaller than the number of resolution and frame rate combinations. In certain embodiments, a plurality of resolution and frame rate combinations is associated with each of a plurality of maximum bitrate levels. In several embodiments, the data concerning target maximum bitrate levels is a lookup table that is indexed by resolution and frame rate combinations and associates specific maximum bitrate levels with specific resolution and frame rate combinations. In other embodiments, any of a variety of data structures can be utilized to identify a target maximum bitrate from a predetermined set of target maximum bitrates to utilize in the encoding of a specific resolution and frame rate combination.

Although a specific architecture is illustrated in FIG. 2, any of a variety of architectures including architectures where the application and/or set of predetermined maximum bitrate levels are located on disk or some other form of storage and is loaded into memory at runtime can be utilized to implement a source encoder in accordance with an embodiment of the invention. Furthermore, any of a variety of system architectures including (but not limited) to the system architecture illustrated in FIG. 1 can be utilized to perform video delivery in accordance with embodiments of the invention. Systems and methods for determining a predetermined set of maximum bitrate levels at which to encode video at a plurality of resolution and frame combinations in accordance with embodiments of the invention are discussed further below.

Determining Target Maximum Bitrates

The initial step in determining a set of predetermined bitrates at which to encode video is determining the characteristics of the video that is likely to be streamed by a streaming system. Once the resolution and frame rate combinations of the video that is likely to be streamed are identified, the optimal target maximum bitrate of each resolution and frame rate combination can be calculated and the results used to determine a set of maximum bitrate levels at which video can be encoded for different resolution and frame rate combinations. The term optimal target maximum bitrate can be used to describe the maximum bitrate beyond which video quality at a specific resolution and frame rate does not appreciably increase. Stated another way, the optimal target maximum bitrate is the lowest bitrate at which the highest quality video can be achieved at a given resolution and frame rate. In using a term such as optimal target maximum bitrate, there is typically an acknowledgement that video quality is subjective. Therefore, there is no concept of a "true" optimal target maximum bitrate. The optimal target maximum bitrate is simply a value that can be determined through subjective experimentation. In many instances, observations concerning target maximum bitrates have resulted in the definition of functions that can be utilized to calculate an optimal target maximum bitrate based upon the resolution and frame rate. As is discussed further below, the technique for determining an optimal target maximum bitrate is not as important as the manner in which that maximum bitrates are utilized to select maximum bitrate levels.

Figure 3:
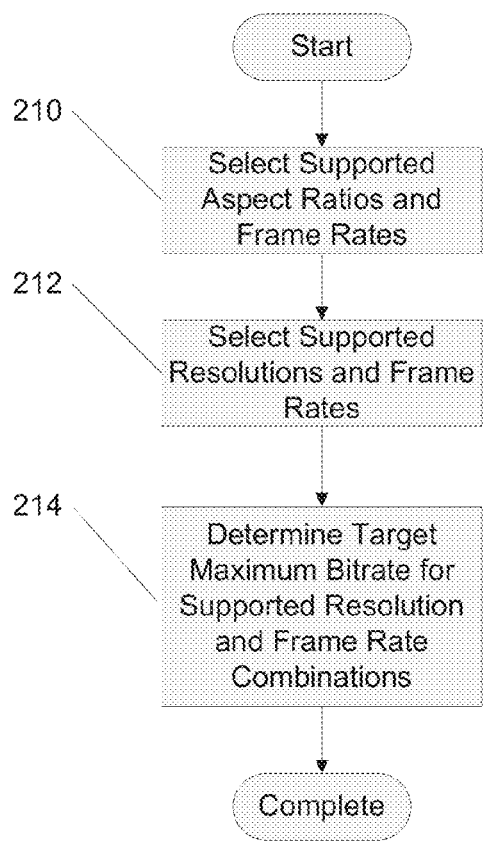
FIG. 3 is a flow chart illustrating a process for determining a set of bitrates given video data in accordance with an embodiment of the invention.

A process for determining optimal target maximum bitrates for video streamed within an adaptive bitrate streaming system in accordance with embodiments of the invention is illustrated in FIG. 3. The process 200 commences by selecting 210 display aspect ratios and frame rates supported by the streaming system. The display aspect ratios and frame rates are typically determined based upon popular display aspect ratios and frame rates supported by playback devices that are likely to be used to stream video within the streaming system. Resolutions can be determined 212 based upon the selected display aspect ratios and, in many instances, based upon anticipated maximum data rates supported within the streaming system. Processes for determining resolutions at which to encode alternative video streams based upon the display aspect ratio of a playback device are described in U.S. patent application Ser. No. 13/430,032 entitled "Selection of Resolutions for Seamless Resolution Switching of Multimedia Content" to Soroushian et al., filed Mar. 26, 2012 (incorporated by reference above).

An optimal target maximum bitrate is determined (214) for each selected frame rate and resolution combination. In several embodiments, maximum bitrate targets are determined 214 utilizing a bitrate formula where the bitrate formula may utilize various aspects of the video data, including frame rate, resolution, and other pertinent information as input. Examples of appropriate bitrate formulas are described in U.S. patent application Ser. No. "Systems and Methods for Encoding Alternative Streams of Video for Playback on Playback Devices having Predetermined Display Aspect Ratios and Network Connection Maximum Data Rates", to Soroushian et al., filed Mar. 28, 2012 (incorporated by reference above). In a number of embodiments, the determination (214) of the optimal target maximum bitrate for a specific resolution and frame rate combination may involve subjective or objective quality evaluation methods of the video data encoded at the target maximum bitrate. Once the optimal target maximum bitrates for each of the resolution and frame rate combinations is determined, a process can then be performed to identify a set of maximum bitrate can be selected based upon the optimal target maximum bitrates. Processes for determining a set of maximum bitrate levels based upon a set of optimal target maximum bitrates associated with specific resolution and frame rate combinations in accordance with embodiments of the invention are discussed below.

Generating Sets of Maximum Bitrate Levels

Figure 4:
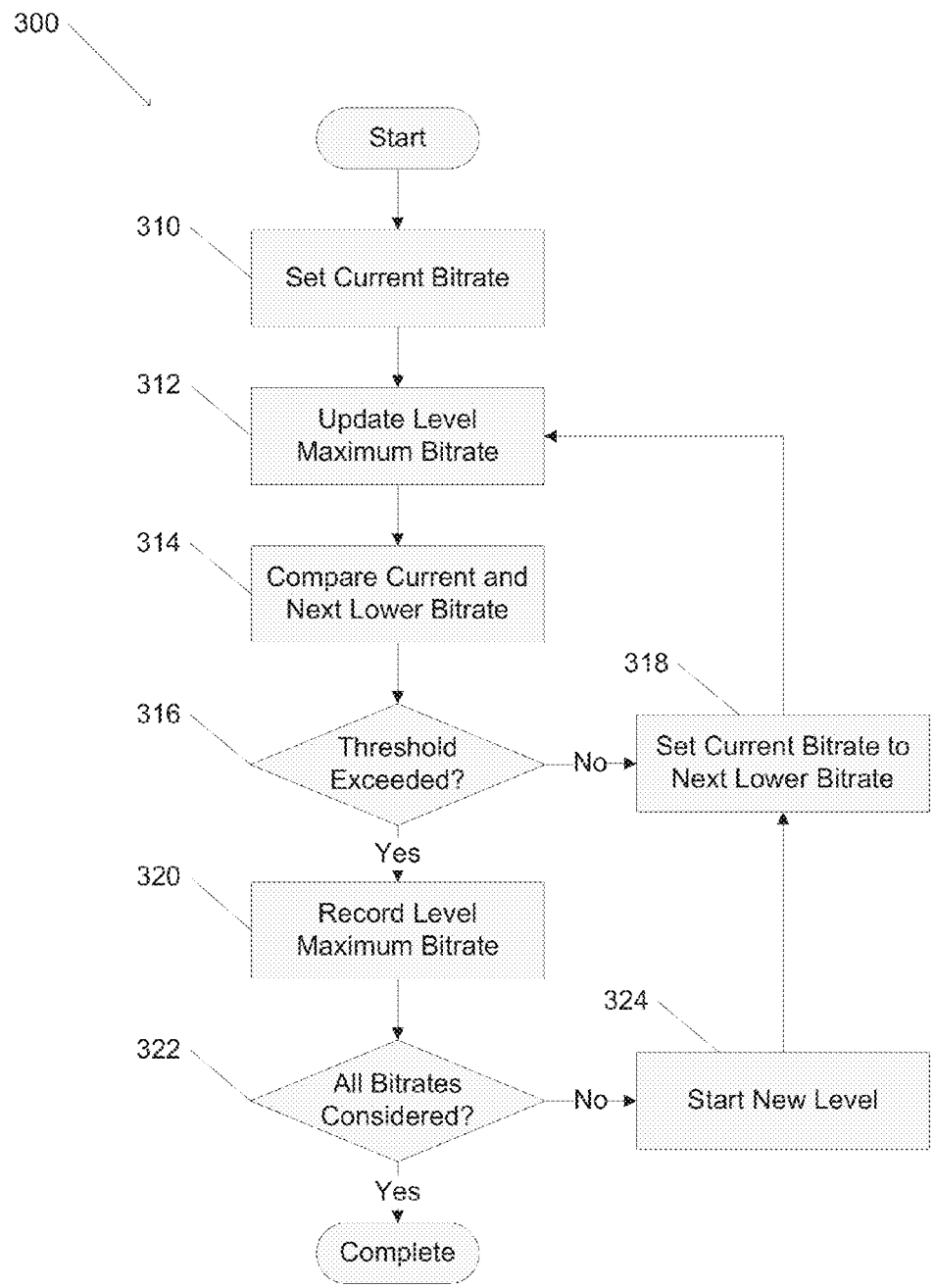
FIG. 4 is a flow chart illustrating a process for determining a set of encoding maximum bitrate levels in accordance with an embodiment of the invention.

A process for determining a set of maximum bitrate levels based upon a set of optimal target maximum bitrates associated with specific resolution and frame rate combinations in accordance with an embodiment of the invention is illustrated in FIG. 4. The process 300 involves setting (310) the current bitrate to the highest optimal target maximum bitrate from a set of optimal target maximum bitrates. The level maximum bitrate is updated (312) utilizing the current bitrate. In many embodiments, the level maximum bitrate may be set to the average, median, minimum, or maximum combination of the bitrates in the current bitrate level. In a number of embodiments, the level average bitrate is a linear or non-linear combination of the bitrates in the current bitrate level. In other embodiments, the level maximum bitrate can be determined after all of the levels are identified.

The current bitrate is compared (314) to the next lower optimal target maximum bitrate in the input set of optimal target maximum bitrates. A decision (316) is then made. Given a threshold value, if the difference between the current bitrate and the next lower optimal target maximum bitrate does not exceed the threshold value, the current bitrate is included in the optimal maximum bitrate level. In other embodiments, any of a variety of criteria can be utilized to determine whether to include a specific resolution and frame rate combination in a level based upon the optimal target maximum bitrate for the resolution and frame combination. Accordingly, the current bitrate is set (318) to the next lower optimal target maximum bitrate and the process loops back to updating (312) the level maximum bitrate. In several embodiments, the threshold value is a percentage difference between consecutive bitrate levels, such as 10%. In several embodiments, the threshold value is a fixed value or is related in a non-linear manner to the value of the current bitrate. If the threshold value is exceeded, the level maximum bitrate is recorded (320) in the set of maximum bitrate levels. In several embodiments, the level bitrate level is rounded to the closest whole number. Another decision (322) is made. If target maximum bitrates remain to be considered, a new level bitrate is started (324), the current bitrate is set (318) to the next highest optimal target maximum bitrate, and the process continues updating (312) the level maximum bitrate of the new level. The process 300 is complete when all bitrates have been considered.

In a number of embodiments, the maximum bitrate levels and the resolutions and frame rates assigned to specific groups can be modified in accordance with the requirements of a specific application. For example, the optimal maximum bitrate at each level can be rounded down (or up) to the closest whole-number multiple of 10, 100 or 1000. Although a specific process is illustrated in FIG. 4, any of a variety of processes can be utilized including a process that groups resolution and frame rate combinations into a predetermined number of levels based upon one or more criteria including (but not limited to) maximizing the similarity of the optimal target maximum bitrates of the resolution and frame combinations at each level.

An example of a grouping of a set of maximum bitrate levels defined based on the resolution, and frame rate of encoded video in accordance with an embodiment of the invention is illustrated in FIG. 5.

For example, in many embodiments of the invention 1440×816 is a sub-resolution for video data having a primary resolution of 1920×816 at 24 frames per second with a sample aspect ratio of 4:3. Likewise, the resolution 1440× 800 is a sub-resolution for video data having a primary resolution of 1920×800 at 24 frames per second with a sample aspect ratio of 4:3. The encoded maximum bitrate of the 1440×816 video is 3,557 Kbps and the encoded maximum bitrate of the 1440×800 video is 3,459 Kbps. In several embodiments, 1440×816 and 1440×800 are within a threshold value of each other and no other resolutions are within the threshold value. The average bitrate for these resolutions is 3,508 Kbps, rounded to 3,500 Kbps. In accordance with an embodiment of the invention, 3,500 Kbps will be one maximum bitrate in the set of maximum profile bitrates.

In order to stream video content at each maximum bitrate level, a variety of resolutions may be utilized depending on the sample aspect ratio and frame rate of the source content. An example profile of recommended resolutions based on the frame rate and primary aspect ratio of the video content for various maximum bitrates is illustrated in FIG. 6. In many embodiments of the invention, the same resolution may be utilized for multiple frame rates and sample aspect ratios in order to maximize the subjective and/or objective quality of the streamed video data.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A source encoder, comprising:
   a processor; and
   storage containing an encoding application and data relating each of a plurality of combinations of a resolution and a frame rate to maximum bitrates;
   wherein the encoding application directs the processor to:
      receive a selection of a plurality of combinations of a resolution and a frame rate for encoding of video content;
      determine an optimal target maximum bitrate for at least one of the received plurality of combinations from the data relating each of the plurality of combinations to maximum bitrates, where an optimal target maximum bitrate is the lowest bitrate at which a highest video quality criterion is satisfied for a specific combination of resolution and frame rate;
      determine a set of maximum bitrates from the optimal target maximum bitrates determined from each of the plurality of combinations; and
      encode the video content into a plurality of alternative streams wherein each of the plurality of alternative streams is encoded at a maximum bitrate from the determined set of maximum bitrates and one of the plurality of combinations of resolutions and frame rates that has an optimal target maximum bitrate at the maximum bitrate.

2. The source encoder of claim 1, wherein the encoder application directs the processor to determine the set of bitrates by:
- grouping the plurality of combinations into a plurality of maximum bitrate levels based upon the optimal target maximum bitrates of each of the plurality of combinations, and
- determining a target maximum bitrate for each of the plurality of maximum bitrate levels including each target maximum bitrate in the set of maximum bitrates; and
- directs the processor to encode the video content into the plurality of alternative video streams by encoding the content in an individual stream for each particular combination of a frame rate and resolution in each particular target maximum bitrate level at the target maximum bitrate for the particular target maximum bitrate level and at the frame rate and resolution of the particular combination.

3. The source encoder of claim 2, wherein the optimal target maximum bitrate of a particular combination of a resolution and a frame rate is determined using a formula.

4. The source encoder of claim 2, wherein the optimal target maximum bitrate of a particular combination of a resolution and a frame rate is determined using experimentation.

5. The source encoder of claim 2, wherein each of the plurality of combinations within a maximum bitrate level has an optimal target maximum bitrate that is within a predetermined percentage of the optimal target maximum bitrate of at least one other of the plurality of combinations within the maximum bitrate level.

* * * * *